United States Patent [19]
Gerez

[11] Patent Number: 5,974,782
[45] Date of Patent: Nov. 2, 1999

[54] METHOD FOR ENABLING OPERATION OF AN AIRCRAFT TURBO-ENGINE WITH ROTOR UNBALANCE

[75] Inventor: Valerio Gerez, Yerres, France

[73] Assignee: Sciete National d'Etude et de Construction de Moteurs d'Aviation "Snecma", Paris, France

[21] Appl. No.: 08/873,452

[22] Filed: Jun. 12, 1997

[30] Foreign Application Priority Data

Jun. 13, 1996 [FR] France ................................ 96 07328

[51] Int. Cl.$^6$ ........................................................ F02C 7/00
[52] U.S. Cl. .................................. 60/204; 60/223; 415/9
[58] Field of Search ......................... 60/204, 223, 226.1; 415/9, 174.4

[56] References Cited

U.S. PATENT DOCUMENTS

| | | | |
|---|---|---|---|
| 3,529,905 | 9/1970 | Meginnis | 415/174.4 |
| 3,836,156 | 9/1974 | Dunthorne | 415/174.4 |
| 4,289,360 | 9/1981 | Zirin . | |
| 4,527,910 | 7/1985 | Fleming . | |
| 5,433,584 | 7/1995 | Amin et al. . | |

FOREIGN PATENT DOCUMENTS

| | | |
|---|---|---|
| 0 063 993 | 11/1982 | European Pat. Off. . |
| 2 115 316 | 7/1972 | France . |
| 2 181 366 | 11/1973 | France . |
| 2 452 034 | 10/1980 | France . |
| 2 453 273 | 10/1980 | France . |
| 1 418 907 | 12/1975 | United Kingdom . |
| 2 281 105 | 2/1995 | United Kingdom . |

*Primary Examiner*—Louis J. Casaregola
*Attorney, Agent, or Firm*—Oblon, Spivak, McClelland, Maier & Neustadt, P.C.

[57] ABSTRACT

A method is described for enabling operation of an aircraft turbo-engine to be continued in spite of the accidental occurrence of an unbalance in a rotor of the engine, such as may be caused by the breakage of a fan blade. The method involves constructing the bearing support of at least one of the bearings of the rotor so that the support has at least two levels of stiffness, arranging for the support to change from a normal stiffness level to a lower stiffness level in response to the occurrence of an unbalance in excess of a predetermined minimum value, and setting the clearance between the tips of the rotor blades and the inner wall of the surrounding casing so that it is at least equal to the radial displacement of the rotor under the action of a predetermined maximum unbalance when the rotor is rotating at the flight idling speed of the engine and the bearing support is at the lower stiffness level. A bearing support construction for implementing the method is also described.

4 Claims, 3 Drawing Sheets

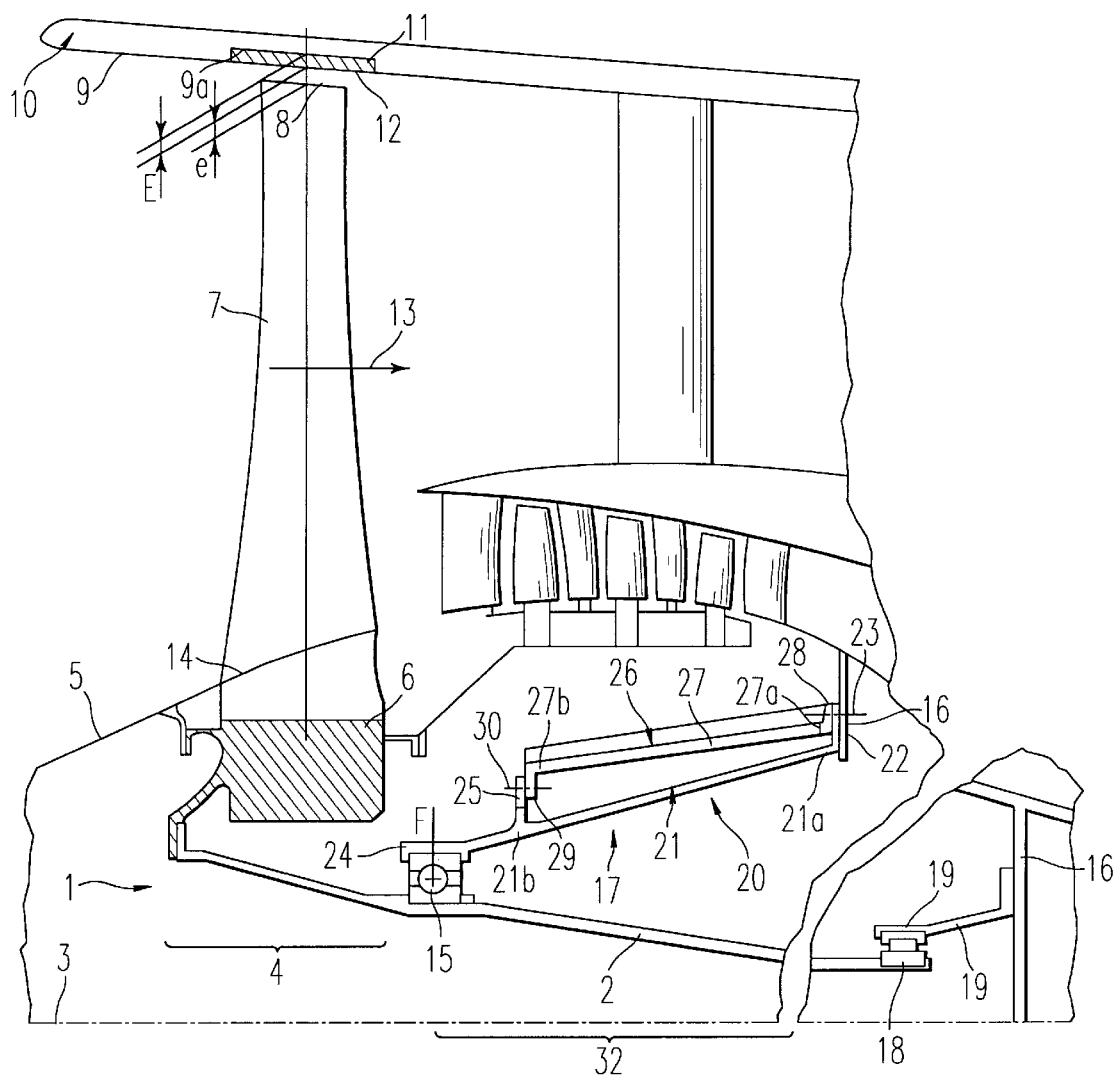

METHOD FOR ENABLING OPERATION OF AN AIRCRAFT TURBO-ENGINE WITH ROTOR UNBALANCE

BACKGROUND OF THE INVENTION

1. Field of the Invention

The invention relates to a method which enables the operation of an aircraft turbo-engine to be continued, in an impaired manner, after the accidental occurrence of an unbalance in a rotor of the engine, such as may be caused by the breakage of a fan blade following impact by a foreign body. The invention also relates to a bearing support specially designed for use in carrying out the method.

An unbalance of an aircraft turbo-engine rotor causes a centrifugal rotational stress during operation which is transmitted to the structure of the turbo-engine through the bearings and bearing supports of the rotor, and through rotor-stator contact in the case of very considerable unbalances, and thence to the structure of the aircraft. There are two types of unbalances: inherent manufacturing unbalances and accidentally caused unbalances. Manufacturing unbalances, although not negligible, are reduced to relatively low values as a result of the care taken in the manufacture of rotors. Accidental unbalances originate chiefly from the breakage of blades and may be substantial, bringing about a rotational stress which may assume very high values requiring immediate shutdown of the turbo-engine in order to avoid the risk of destruction of the turbo-engine and aircraft structures. The breakage of a blade usually occurs close to the ground during the takeoff or landing of the aircraft, as a result of the accidental entry of foreign bodies such as birds into the air intake of the turbo-engine. Such an accident requiring the immediate shutdown of the engine may, in some circumstances, lead to the crashing of the aircraft. A first problem to be solved therefore is to keep the turbo-engine running in spite of an unbalance caused, for example, by the breaking of a blade, even if only for a limited period and with a reduced thrust, long enough for the aircraft to land.

Modern turbo-engines are generally of the bypass type and include a first stage of rotating blades termed "the fan" which provides the main part of the propulsion force, particularly in subsonic turbo-engines. These fan blades are very vulnerable to breakage because they are placed right at the front of the turbo-engine and because they are thin, of great size and are held by the rotor at one end only, the other end at the periphery of the rotor being free. Although a break will usually occur towards the free tip of the blade, the unbalance created may be substantial because of the great size of the blade. For example, in a large turbofan engine, the unbalance may reach 3 to 4 kg.m, which, taking into account the elasticity of the structure and the resonance phenomena resulting therefrom, can bring about a rotational stress of the order of $10^5$ DaN at 5000 rpm. A second problem therefore is to keep the turbo-engine running with such a large unbalance.

To improve the performance of a turbo-engine in normal operation, it is necessary to reduce air leaks between each stage of rotating blades and the inner wall of the casing facing the rotating blades. For this purpose, the clearance between the inner wall and the tips of the blades is increased, and this portion of the wall is lined with a soft material, referred to as abradable, to a thickness which is sufficient to interfere with the blades. When rotating, the blades exert a planing action on the abradable material and thereby adjust its thickness to the exact dimensions of the rotor, thus reducing air leakage to a minimum. A third problem is, therefore, to ensure that this leakage does not increase during the normal operation of the turbo-engine.

2. Summary of the Prior Art

A bladed rotor, and particularly a fan, inevitably possesses an inherent manufacturing unbalance which is all the more substantial if the fan is heavy and of great diameter. During rotation, this unbalance in conjunction with the natural elasticity of the turbo-engine structure brings about a radial and centrifugal rotational stress, with resonance points corresponding to the natural modes of the rotor and structure assembly, which would lead to an accelerated fatigue of the bearings and of the structure of the engine. To avoid this, the bearings of the rotor, and more particularly its front bearing, are usually held by a resilient bearing support which functions primarily to reduce vibrations and reduce the stresses transmitted to the engine structure. European Patent 63993 discloses such a bearing comprising a resilient element having a range of movement in a radial plane, the resilient element being in the shape of an open-work truncated cone forming a squirrel cage, and the movement of this resilient element being limited radially by a rigid element which is also in the shape of a truncated cone.

However, such a bearing suffers from the drawback of increasing the amplitude of the radial vibrations of the rotor, which causes an additional planing of the abradable material and hence air leakage. In practice, the designer must therefore limit the elasticity of such a bearing to the amount strictly necessary to reduce the vibrations resulting from the small manufacturing unbalance of the rotor. Consequently, this bearing does not provide a solution to the problems posed by accidentally occurring unbalance of the rotor.

U.S. Pat. No. 4,289,360 discloses a turbo-engine including a bearing support which is normally rigid but which can be released by the breakage of connection elements in response to the substantial unbalance resulting from a broken blade, the rotor rotating in a casing with an increased clearance filled in by a thicker layer of abradable material. The rotor then tends to rotate around its new axis of inertia, which reduces the unbalance and the stress exerted on the structure of the turbo-engine. However, such an arrangement can operate correctly only with efficient damping, and this is provided by segments which are movable relative to one another and are separated by oil films. This arrangement is not practical for the large turbo-engines used for aircraft, as they would require damping means of a mass and size which would be excessive, as well as substantial cooling means to protect the oil from overheating and eventual carbonisation.

Another known solution, which is particularly suited to the fan stage, again consists of equipping the turbo-engine with a bearing support designed to be released by the breakage of connection elements in response to a substantial unbalance resulting from a broken blade, the fan rotating in the casing with a smaller clearance filled by the abradable material. After the breakage of a blade and the release of the bearing, the fan, in tending to rotate around its new axis of inertia, planes away the abradable material so that the tips of the blades come to bear against the casing. The casing then guides the rotation of the fan and thus acts as a bearing. This solution allows the fan to be rotated for a very limited period of time, thereby obtaining a thrust from the engine, albeit a weak one. As the casing is rigid, this solution shifts the natural mode towards high rotational speeds, which lowers the rotational stress at low speeds, but increases the said rotational stress at high speeds. This stress may reach, for example, $10^5$ DaN at 5000 rpm. There are thus four drawbacks to this solution.

1) The maximum rotational stress occurs at the most critical moment in the flight of the aircraft, i.e. on take-off when the turbo-engines are operating at their maximum speed to supply maximum thrust.

2) Considerable energy is produced by the friction of the tips of the blades against the casing, and this energy may cause the blades to vibrate in a direction transversely to the blade, leading to the risk of further blades being broken and the danger of fire.

3) Dry friction of the tips of the blades against the casing is tolerable only for a very short period.

4) The casing must be reinforced to provide for its possible function as a bearing, resulting in an increase in the mass and cost.

Also known from U.S. Pat. No. 4527910 is a bearing support including a resilient squirrel cage element having its movement limited by a fixed ring, the energy thus produced being absorbed by a viscous damping. The fixed ring is itself capable of being freed by the breakage of its connection elements, thereby allowing a more substantial movement, and the energy of this is partly absorbed by a second viscous damping. As will be appreciated, such a solution is not practical for large aircraft turbo-engines, as the damping elements required would be prohibitive in terms of size and mass.

SUMMARY OF THE INVENTION

With the aim of overcoming the aforementioned problems, the invention provides a method enabling operation of an aircraft turbo-engine to be continued at a rotational speed at least equal to the flight idling speed V1 of said turbo-engine after the accidental occurrence of an unbalance in a rotor of said turbo-engine, provided said unbalance remains below a pre-established maximum, the said turbo-engine including a fixed structure, a casing within which said rotor rotates with a radial clearance E between the tips of the blades of said rotor and the inner wall of said casing, bearings rotatably mounting said rotor, and bearing supports connecting said bearings to said fixed structure of said turbo-engine, said method comprising the steps of:

a) constructing the bearing support of at least one of said bearings so as to possess at least two stiffness levels, namely a "normal" stiffness level corresponding to a natural mode of said rotor above said flight idling speed V1 of said turbo-engine, and a "lower" stiffness level corresponding to a natural mode of said rotor below said flight idling speed V1;

b) arranging for said bearing support to change from said normal stiffness level to said lower stiffness level in response to the occurrence of an unbalance at least equal to a pre-established minimum; and, c) setting said clearance E to be at least equal to the radial displacement of said rotor under the action of said pre-established maximum unbalance when said rotor is rotating at said flight idling speed V1 and said bearing support is at said lower stiffness level.

Thus, the turbo-engine operates under its normal conditions for as long as an accidental unbalance does not occur in the rotor. However, after the occurrence of such an unbalance, the change of the bearing support in accordance with the invention from the normal stiffness level to a lower stiffness level brings about a lowering of the natural mode of the rotor to a speed lower than V1, the effect of this at speeds above V1 being to lower the rotational stress F transmitted by the rotor to the fixed structure of the turbo-engine, with the result that operation of the turbo-engine at these speeds is possible.

Advantageously, the bearing support may belong to the bearing for the fan stage of the turbo-engine, as it is this stage which is particularly exposed to impact from foreign bodies, and hence to blade breakages.

Preferably the change of the bearing support from the normal stiffness level to a lower stiffness level occurs as a result of the breakage of breakable connection elements in the bearing support under the action of said pre-established minimum unbalance.

The invention also provides a bearing support for use in carrying out the method of the invention. More particularly the invention provides a bearing support for a bearing of a rotor in an aircraft turbo-engine including a fixed structure, said bearing support comprising a plurality of resilient elements mounted in parallel, and connecting means for connecting each of said resilient elements between said bearing and said fixed structure of said turbo-engine, said connecting means for all of said resilient elements except one comprising breakable elements. These breakable elements will be designed to break as a result of the radial stress caused by an unbalance of the rotor exceeding a predetermined minimum level.

In a preferred embodiment, the resilient elements are concentric, either in the form of barrels or thin cylindrical or truncated walls, and are joined at one end to the fixed structure of the engine and at the other end to the bearing. The joints are permanent at one end and, for all of the elements except one, are breakable at the other end by means of breakable elements disposed axially and being arranged to break under a shearing and tensile stress in a plane radial to the axis of the engine.

In normal operation of the turbo-engine, the resilient elements are rigidly connected. The stiffness of the resilient elements are thus added together so that the overall stiffness of the bearing support is at a maximum and just allows absorption of the low rotational stress caused by the inevitable manufacturing unbalance. The rotor is thus firmly guided in rotation by the bearing and planes the abradable material of the casing in the course of its initial rotations after mounting to produce in this abradable material a passage that is just sufficient, thereby keeping air leakage to a minimum and the efficiency of the turbo-engine at an optimum level.

However, if an accidental unbalance of the rotor occurs during operation of the engine, the rotational stress caused by the unbalance causes the breakable connection elements to rupture so that all the resilient elements except one become inoperative and the bearing support becomes radially more flexible. This relaxation shifts the natural mode of the rotor towards the low rotational speeds with two important consequences:

the maximum rotational stress is reduced in the vicinity of the natural mode; and the rotational stress at speeds beyond the natural mode of the rotor becomes low, which permits, at least for a limited period, the impaired operation of the turbo-engine and the maintenance of a thrust in the flight range from flight idling speed V1 to full throttle speed V2.

The term "clearance consumption" is used to denote the radial amplitude D of the displacement of the rotor relative to its original axis, this amplitude being equal to the thickness of the planed abradable material. During impaired operation, and at speeds V<V1 the clearance consumption of the rotor relative to the stator increases with the flexibility of the bearing support and with the magnitude of the accidental unbalance. Consequently the engine designer will define a sufficient clearance E between the tips of the blades and the inner wall of the casing for the rotor always to be guided in rotation by the bearing after breakage of the breakable elements and not to come into contact with the casing, at least for normal rotational speeds of the turbo-engine in its flight range and a pre-established degree of damage, thereby maintaining the effect sought by the invention.

The present invention should not be confused with the bearing support disclosed in European patent 63993. In that case there is no breakable connection and the rigid element surrounding the flexible element comes into play when the natural mode has been overstepped, or in the event of an unbalance, in order to limit the radial travel of the flexible element, resulting in a displacement of the natural mode towards the high rotational speeds and a corresponding increase of the rotational stress resulting from the unbalance, which is the opposite of the effect produced and result obtained with the present invention.

The present invention should also not be confused with the bearing support disclosed by the afore-mentioned U.S. Pat. No. 4,527,910. That bearing support has only one flexible element which remains active in all circumstances, and the breakable connections allow action only on the damping of vibrations. Such a bearing support does not lead to radial relaxation of the rotational guidance of the fan and lowering of the natural mode of the fan following the occurrence of an accidental unbalance, as in the present invention. Moreover, the viscous damping means do not permit the use of such a bearing support in large turbo-engines.

Another advantage of the bearing support in accordance with the invention is that after breakage of the breakable connections it permits continued operation, albeit impaired, of the engine without additional means for axially positioning the bearing held by the bearing support, since this is maintained by the resilient element which is not provided with a breakable connection. Since the continued operation is without friction, in contrast to the device disclosed in French Patent 2463853, the bearing support of the invention may be used in cooperation with a bearing acting as a stop to maintain the axial positioning of the blades and to take up the axial thrust to which the shaft is subjected.

The present invention is therefore well suited to use in the fan stage of a large turbo-engine, the said fan stage rotating on a large bearing acting as a stop, and generally of the ball type. The fan stage generates the best part of the turbo-engine thrust, and this thrust is transmitted to the turbo-engine structure via the bearing and the bearing support, even during impaired operation.

Another advantage of the bearing support of the invention is the absence of heat dissipation after the breakable connections have broken, in contrast to devices requiring damping, which avoids having to provide additional cooling means in large turbo-engines. Another advantage is the reduction of the risk of rotor/stator interaction following from the increased clearance E, and the resulting mass reduction gain.

The present invention also has the advantage, in its preferred method of implementation, of using a bearing support which is simple, is of low cost, and has an overall shape, size, and means for connection to the bearing and the structure of the turbo-engine which is very similar to the standard bearing supports usually used in turbo-engines. The present invention may therefore be applied to a turbo-engine regardless of its structure.

A preferred embodiment of the invention will now be described, by way of example, with reference to the accompanying drawings.

BRIEF DESCRIPTION OF THE DRAWINGS

FIG. 1 illustrates diagrammatically the fan stage of a turbo-engine fitted with a bearing support in accordance with the invention.

FIG. 2 is a diagram illustrating the stiffness characteristic of a bearing support of the invention, the abscissa representing the rotational stress F bringing about the radial deformation of the bearing, and the ordinate representing the radial displacement D of the bearing corresponding thereto.

DESCRIPTION OF THE PREFERRED EMBODIMENT

Figure 3:
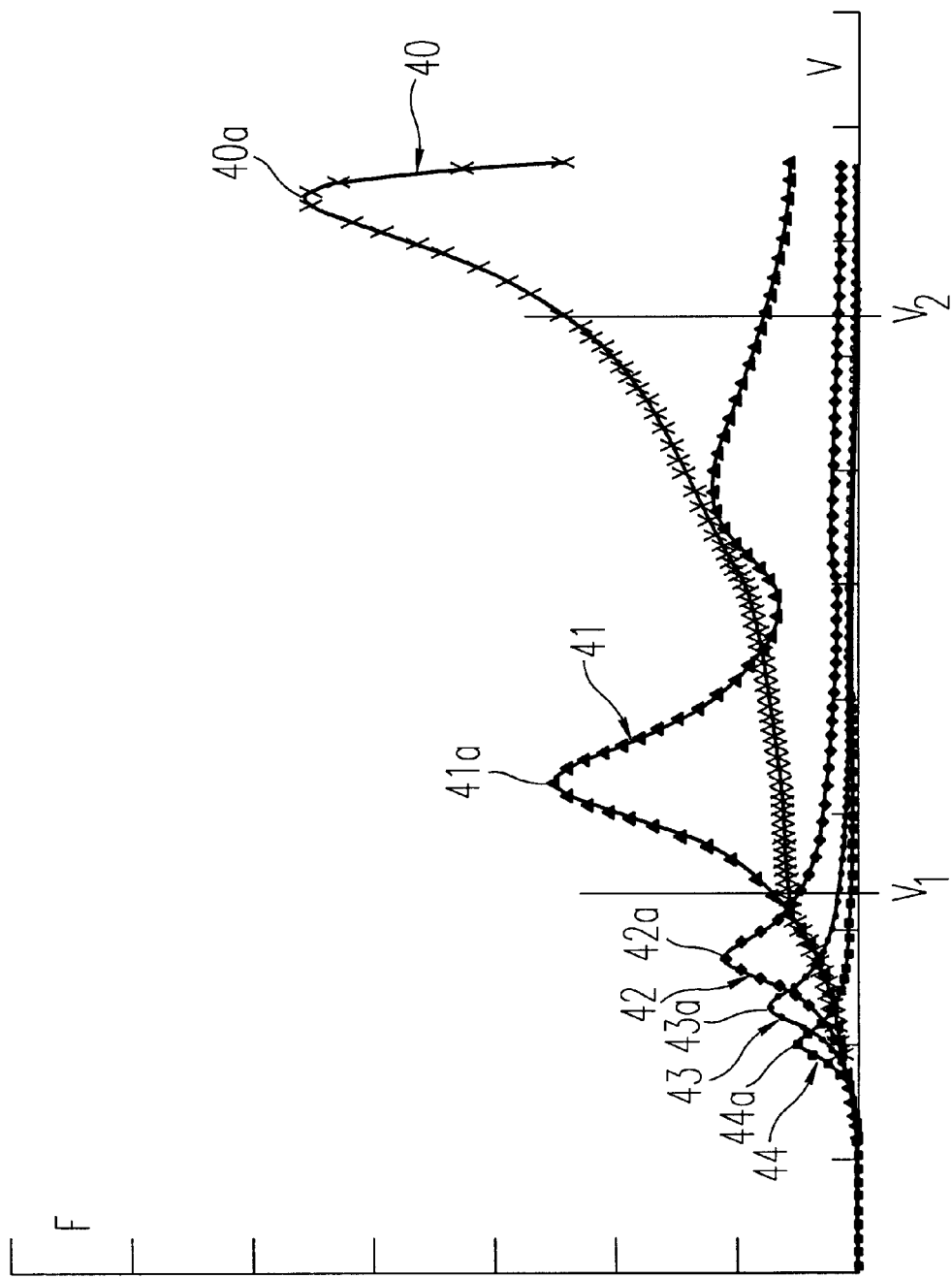
FIG. 3 is a graph showing the rotational stress F exerted by the rotor on the bearing as a function of the rotational speed V of the rotor for different types of bearing support, the ordinate representing the rotational stress F in decaNewtons (DaN) and the abscissa representing the rotational speed V in rpm.

In this embodiment the turbo-engine is of the bypass type normally used on large subsonic transport air craft. Such turbo-engines are well known and, so as not to burden this description needlessly, only those components of the turbo-engine that are required for a good understanding of the invention will be described.

Referring now to FIG. 1, the rotor 1 of the engine comprises a shaft 2 mounted to rotate around a geometric axis of rotation 3, and at its forward end a fan stage 4 rigidly connected to the shaft 2 and the air intake coner at the front of the engine. The fan stage 4 comprises a ring 6 rigidly connected to the front end of the shaft 2, and a plurality of blades 7, termed fan blades, extending radially from the periphery of the ring 6. The tips 8 of the blades 7 extend to the vicinity of the inner wall 9 of a casing 10 sur rounding the fan stage 4. The part 9a of the inner wall 9 situated facing the tips 8 of the blades 7 is lined with an abradable coating 11, and the inner surface 12 of this coating is planed by the tips of the blades 8 during the initial rotations of the rotor 1, the surface 12 remaining, however, approximately flush with the inner wall 9 of the casing 10. The reduced clearance thus constituted between the tips 8 of the blades 7 and the inner surface 12 of the abradable material 11 is denoted by "e". The clearance between the tips 8 of the blades 7 and the part 9a of the inner wall 9 of the casing 10 is denoted by "E", this clearance being filled by the abradable coating 11 during the normal operation of the turbo-engine.

It will be understood that as a result of the rotation of the rotor 1, the blades 7 are rotated about the geometric axis 3 to create a flow of air 13 from the front of the engine, between the air intake cone 5 extending from the periphery 14 of the ring 6 and the inner wall 9 of the casing 10, towards the rear of the engine to generate the thrust produced by the turbo-engine. It will also be understood that the clearance "e" allows leakage from this air flow, and this clearance "e" must therefore be kept to a minimum during the normal running of the turbo-engine in order not to impair the efficiency of the fan stage 4.

The shaft 2, and hence the rotor 1, is rotatably mounted and also located axially near its forward end by a ball bearing 15 which is connected to the fixed structure 16 of the turbo-engine via a bearing support 17 disposed just to the rear of the fan stage 4. The shaft 2 is also rotatably mounted at the rear of the turbo-engine by a roller bearing 18 connected to the structure 16 of the turbo-engine via another bearing support 19.

The bearing support 17 is substantially symmetrical around the geometric axis 3, and comprises a first resilient element 20 consisting of a flexible frusto-conical wall 21 having its wider end 21a extended radially outwards by a flange 22 fixed to the structure 16 of the turbo-engine by a plurality of bolts 23. At its narrower end 21b, the wall 21 is extended axially by a member 24 which grips the outer ring of the bearing 15, and radially outwards by a thin flexible flange 25.

In this embodiment the flanges 22 and 25 are each in the form of a flat washer concentric with the geometric axis 3, and are thus disposed in planes perpendicular to the axis 3, the said washers 22 and 25 each being rigidly connected at its inner edge to the wall 21.

The bearing support 17 also comprises a second resilient element 26 consisting of a flexible frusto-conical wall 27 having its wider end 27a extended radially outwards by a flange 28 fixed to the structure 16 by the same bolts 23 as the flange 22 of the first element 20, the flange 28 abutting the flange 22. The narrower end 27b of the flexible wall 27 is extended radially inwards by a second flange 29 which faces the flange 25 with a small clearance.

The flanges 28 and 29 are each in the form of a flat washer concentric with the geometric axis 3, and are thus disposed in planes perpendicular to the axis 3, the flange 28 being integrally connected at its inner edge to the wider end 27a of the wall 27, whereas the flange 29 is integrally connected at its outer edge to the narrower end 27b of the wall 27.

The flanges 25 and 29 are rigidly connected together by breakable connecting elements 30 which are designed to break as a result of a pre-determined radial force F applied to the bearing 15. For example, the breakable elements 30 may be bolts disposed parallel to the geometric axis 3, the section of the bolts being weakened so as to cause the bolt to shear in response to the radial force F.

The bearing support 17 operates as follows. During normal running of the engine, the breakable connection elements 30 remain intact and bind the flanges 25 and 29 one against the other so that the bearing 15 is held simultaneously by both of the flexible walls 21 and 27, the stiffnesses of which combine with each other and with the stiffness of the structure 16 of the turbo-engine. This stiffness is high and just allows absorption of the force F resulting from the low manufacturing unbalance, so that the space "e" between the tips 8 of the blades 7 and the inner surface 12 of the abradable material 11 is minimal.

When the force F exceeds a pre-established minimum, for example as a result of the breakage of a blade 7, the breakable connection elements 30 rupture so that the resilient element 26 no longer participates in the holding of the bearing 15, this function then being performed by the resilient element 20 alone. The bearing 15 is therefore held radially with a reduced stiffness which is that of the resilient element 20 combined with that of the structure 16 of the turbo-engine. The amplitude D of the radial displacement of the shaft 2 increases, and the flange 25 moves relative to the flange 29 in a plane perpendicular to the geometric axis 3.

The diameters of the wider ends 21a and 27a of the elements 20, 26 may be close, but the narrower end 27b will preferably have a diameter much greater than that of the narrower end 21b so that the connection elements 30 may be positioned closer to one of the other of the ends 21b or 27b. This makes it possible to increase the radial width of one of the flanges 25 or 29, while binding it in the vicinity of its edge. This wider flange 25 or 29 is therefore axially more flexible, i.e. in a direction parallel to the geometric axis 3, and reduces the axial stresses imposed on the breakable connection elements 30.

Advantageously, the flange 25 will be situated forward of the flange 29. The reason for this is that after the breakage of the breakable connections 30 the fan stage 4 continues to exert a substantial thrust, which tends to draw the shaft 2 and the bearing 15 towards the front of the turbo-engine. The flange 25 will therefore move slightly forwards as a result of the residual flexibility of the wall 21 in an axial direction, thereby slightly displacing it from the flange 29. This means that the flange 25 will not rub against the flange 29 when the rotor moves in a plane perpendicular to the geometric axis 3 under the action of the accidental unbalance. This prevents wear resulting from friction between the facing faces of the flanges 25 and 29, as well as a substantial release of heat which would give rise to additional heating of the bearing 15 and its support 17, such heating being damaging to the mechanical strength of these two highly stressed parts 15 & 17.

If the flange 25 is situated forward of the flange 29, the free edges of the flanges 25 and 29 will be crenellated around their entire circumference so as to permit the assembly of the flexible elements 20 and 26, the peaks of each flange being able to pass through the troughs of the other flange when the element 26 is moved into place around the element 20 by moving it axially rearwards. When the flanges 22 and 28 have come into contact, it will suffice then to rotate the element 26 relative to the element 20 around the axis 3 so as to bring into registry the peaks of the flanges 25 and 29, as well as registry of the holes through which the connection elements 23 and 30 will be passed.

The radial displacement D of the bearing 15 resulting from an accidental unbalance is accompanied by a substantially equivalent displacement of the path of the tips 8 of the blades 7. As a result of the rotation of the fan stage 4 combined with the radial displacement D, the tips 8 of the blades 7 act to plane the abradable material 11 to a depth equal to the radial displacement D. The engine designer, using calculations and the usual tests, will define a clearance E>D sufficient for the tips 8 not to come into contact with the internal wall 9a of the casing 10, provided a pre-established maximum unbalance is not exceeded and the rotational speed of the fan stage 4 stays within a pre-established range. This clearance will of course depend on the stiffness of the flexible element 20 which remains active, and also upon the particular characteristics of the rotor 2 and the structure of the turbo-engine.

It will be appreciated that the designer will size the clearance E according to the maximum degree of damage, i.e. on the maximum unbalance, for which he wants to achieve continued operation of the turbo-engine.

A turbo-engine rotor includes several stages of blades 31 grouped together as functional units, such as the low pressure compressor 32, to the rear of the fan stage 4, and thus closer to the rear bearing 18. The radial displacement of the fan stage 4 will of course affect the radial displacement of each of the other stages 31, and the engine designer will provide sufficient clearance between the tips of the blades of these stages 31 and the inner wall of the respective casing which surrounds them, this clearance also being filled by abradable material.

Referring now to the graph shown in FIG. 2, the straight line segment 35 represents the radial displacement D of the bearing 15 as a function of the rotational force F during normal operation of the turbo-engine. As a result of the elastic deformation of the bearing support, this displacement is linear and remains at very low values, being just enough to absorb the manufacturing unbalance of the rotor. When the rotational force F reaches a pre-established threshold $F_0$ corresponding to the minimum unbalance at which it is desired to alter the operation of the bearing support 17 and of the turbo-engine, the breakable elements 30 rupture and the bearing becomes more flexible. The displacement D as a function of F under these conditions is represented by the straight line 36, the slope D/F of which is much higher than that of the straight line segment 35.

With reference to FIG. 3, the abscissa represents the rotational speed of the rotor 1, a value of 2000 rpm being given to the idling speed during flight and a value of 5000 rpm being given to the maximum speed V2 corresponding to full throttle used on take off. The engine therefore operates within this range V1 to V2 during flight of the aircraft. The ordinate represents the rotational force F in DaN (DecaNewtons) which the rotor exerts on the structure 16 through the bearing 15 and the bearing support 17. The set of curves is given for an unbalance of 3 kg.m, corresponding approximately to the breaking of the upper third of a fan blade, using different bearing supports.

The curve 40 represents the rotational force F when using a standard bearing support with a reduced clearance E between the tips 8 of the blades 7 and the inner wall 9a of the casing 10. Under the action of the rotational force F, the bearing support and the structure 16 become deformed elastically, and the tips 8 of the blades 7 plane the abradable material and come in contact with the wall 9a. The casing 10 then provides the guidance for the fan stage 4 in cooperation with the bearing 15. The radial stiffness of the guidance is, in these conditions, increased and corresponds to the rigidity of the casing 10 increased by the stiffness of the bearing support in combination with that of the stru cture 16, the effect of which is to displace the natural mode 40a of the rotor 1 beyond the maximum speed V2. In spite of this, the force F reaches $100.10^3$DaN at 5000 rpm, and remains greater th an $25.10^3$DaN above 2000 rpm. Such stresses are difficult for the structure 16 of the turbo-engine or the structure of the aircraft to bear, and the pilot of the aircraft consequently has to stop the engine as soon as possible.

The curve 41 represents the rotational force using the same bearing support and a clearance E sufficient for the tips 8 of the blades not to come into rubbing contact with the inner wall 9a of the casing 10. The natural mode 41a in this case is situated in the lower third of the range of engine speeds V1-V2 during flight. The rotational force F remains above $25.10^3$DaN throughout the flight range and reaches $100.10^3$DaN at the natural mode 41a in the lower third of the flight range. A mere enlargement of the clearance E does not therefore supply a solution to the problem.

Curves 42, 43 and 44 represent the rotational force F using three different bearing supports 17 in accordance with the invention, each having a different level of stiffness, the breakable connections 30 being broken and the clearance E being assumed to be large enough for the tips 8 of the blades 7 not to come into rubbing contact with the inner wall 9a of the casing 10.

The flexibility of the bearing support becomes higher as one passes from curve 42 to curve 43, and from curve 43 to curve 44, but the corresponding natural modes 42a, 43a and 44a are all situated below the flight idling speed V1 The result is that the rotational force F is lowered in the flight range V1-V2, remaining within the range of 24 to 8 DaN for the curve 42, within the range 7.8 to 4.4 DaN for the curve 43, and within the range 3.3 to 2.2 DaN for the curve 44. The rotational force is thus lowered substantially, particularly in the case of the curve 44, and can therefore be withstood much better by the structure of the turbo-engine and the aircraft. Because the rotational force F decreases within the flight range V1-V2 as the rotational speed V increases, the operation of the turbo-engine is further improved at high engine speeds, and particularly at full throttle V2.

Figure 4:
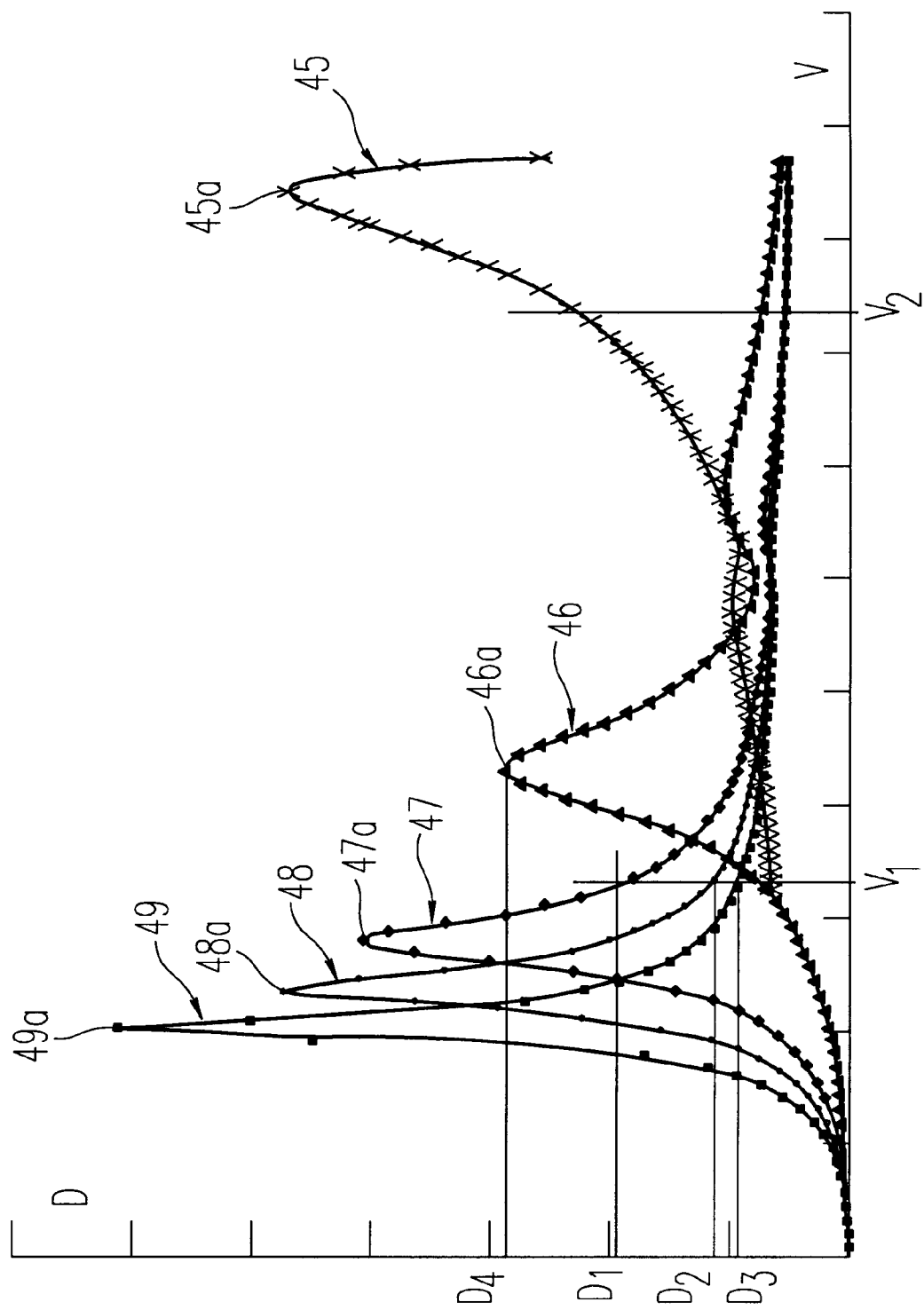
FIG. 4 is a graph showing the clearance consumption of the rotor relative to the stator as a function of the rotational speed V of the said rotor for the same bearing supports as in FIG. 3, the clearance consumption D being indicated along the ordinate, and the rotational speed V being indicated along the abscissa in rpm on the same scale as in FIG. 3.

Turning to the graph of FIG. 4, the abscissa is identical to that of the graph in FIG. 3, whereas the ordinate represents the displacement D of the fan stage 4 relative to the casing in a plane perpendicular to the geometrical axis 3. The curves 45, 46, 47, 48 and 49 represent the displacement D under the conditions corresponding to the curves 40 to 44 respectively in the graph of FIG. 3. The displacement D is obviously at a maximum at the rotational speeds corresponding to the natural modes of the fan, i.e. as shown respectively at 45a, 46a, 47a, 48a and 49a.

In the case of the curve 45, the natural mode 45a is positioned beyond the full throttle speed V2. The displacement is therefore substantial at full throttle and decreases with the rotational speed in the operating range V1-V2 of the turbo-engine.

In the case of the curve 46, the displacement D is substantial throughout the operating range V1-V2 and passes through a maximum in the lower third of this range.

In the case of the curves 47, 48 and 49, the respective natural modes 47a, 48a and 49a are positioned below the flight idling speed V1. The displacement D is therefore more substantial at the flight idling speed V1 but decreases as the rotational speed increases. Accordingly, these curves show that the operation of the turbo-engine is improved at the higher operating speeds, and particularly at full throttle V2, this advantage also being illustrated by the graph of FIG. 3.

The engine designer will give the clearance E a value at least equal to the displacement D indicated by the curves 47, 48, 49 at the speed V1, i.e. respectively the clearance consumptions D1, D2 and D3. Thus, during flight or landing, the turbo-engine will be operating at speeds above V1 and the tips 8 of the blades will not touch the wall 9a of the casing.

It should be noted, however, that when the pilot shuts down the damaged turbo-engine, the rotational speed V will pass through the natural mode 47a, 48a or 49a and the tips 8 of the blades will then come to rub against the inner wall 9a of the casing 10. This phenomenon, however, will not have any serious consequences, as it takes place outside the flight range V1-V2 and for a very short space of time, with a low bearing force and a possible dissipation of energy at most equal to the kinetic energy remaining in the rotor below the flight idling speed V1. It will also be noted that the clearance D1, D2 or D3 remains below the clearance D4 corresponding to the natural mode 46a of the curve 46, with a ratio D3/D4=⅓ in the case of the curve 49.

It will be further noted that as a result of the lowering of the clearance E to the value D1, D2 or D3, the corresponding curves 47, 48 and 49 no longer represent the real displacement of the rotor, which is limited approximately to the clearance D1, D2 or D3. The same applies to the curves 42, 43 and 44.

Although the lowering of the natural mode 42a, 43a or 44a lowers the rotational force F and the radial displacement D in the flight range of engine speeds, the designer will preferably keep the natural mode at a value at least equal to V1/4, and preferably at least V1/2, so as to impart to the resilient element 20 a stiffness sufficient to limit the radial displacement of the rotor 1 as a result of a radial acceleration originating, for example, from a change of direction of the aircraft. This prevents the tips 8 of the blades 7 from coming into contact with the inner wall 9a of the casing 10 for radial accelerations at least below a pre-established threshold, thereby improving the manoeuvrability of the aircraft.

The curves 42 and 47 of the graphs of FIGS. 3 and 4 show that the rotational force F and the radial displacement D decrease as the rotational speed V increases. Thus, when the aircraft manoeuvres near the ground with a turbo-engine damaged during take-off, the pilot can still raise or hold the turbo-engine at full throttle V2 in order to fly over any obstacles before him.

Another advantage of the invention is that the rotational force F and the clearance consumption D may be kept very low while maintaining the axial position of the rotor using a bearing with stop action, for example a ball bearing, without creating heat through friction as in the devices disclosed in French Patent 2463853 and U.S. Pat. No. 4,527,910 as mentioned earlier. The invention may therefore be used without additional cooling means in large turbo-engines.

Yet another advantage of the invention is that the bearing support 17 used has, at least in its preferred form, a general shape, an overall size, and a method of connection to the bearing 15 and to the structure 16 of the turbo-engine similar to the known types of bearing supports usually used in turbo-engines. Consequently, the invention is applicable easily to existing turbo-engines.

A further advantage is that the danger of interaction between the casing and the rotor is reduced as a result of the clearance E being increased.

The present invention is of course not limited to the embodiment which has just been described by way of example. Although its most significant application is the accommodation of the breaking of a fan blade, the invention may also be applied to other causes of rotor unbalance, particularly the breaking of a blade in a compressor or turbine stage, through adaptation of the appropriate clearances E and bearing supports, for example the rear support 19.

Turbo-engines, especially the largest ones, may include an additional bearing for holding the shaft 2 intermediate the forward bearing 15 and the rear bearing 18, so that the shaft 2 may be made more flexible. In this case, the additional bearing support in such an arrangement will be preferably constructed according to the invention.

The bearing support may also have more than two resilient elements, all except one of these elements each including breakable connections and the strength of the connections increasing from one element to the next so as to guard against damage which increases progressively.

I claim:

1. A method enabling operation of an aircraft turbo-engine to be continued at a rotational speed at least equal to the flight idling speed of said turbo-engine after the accidental occurrence of an unbalance in a rotor of said turbo-engine, provided said unbalance remains below a pre-established maximum, the said turbo-engine including a fixed structure, a casing within which said rotor rotates with a radial clearance between the tips of the blades of said rotor and the inner wall of said casing, bearings rotatably mounting said rotor, and bearing supports connecting said bearings to said fixed structure of said turbo-engine, said method comprising the steps of:

a) constructing the bearing support of at least one of said bearings so as to possess at least two stiffness levels including a "normal" stiffness level corresponding to a natural frequency of said rotor above said flight idling speed of said turbo-engine, and a "lower" stiffness level corresponding to a natural frequency of said rotor below said flight idling speed;

b) arranging for said bearing support to change from said normal stiffness level to said lower stiffness level in response to the occurrence of an unbalance at least equal to a pre-established minimum; and, c) setting said radial clearance to be at least equal to the radial displacement of said rotor under the action of said pre-established maximum unbalance when said rotor is rotating at said flight idling speed and said bearing support is at said lower stiffness level.

2. A method in accordance with claim 1, wherein said bearing support belongs to the bearing for the fan stage of said rotor.

3. A method according to claim 1, wherein the change of said bearing support from said normal stiffness level to said lower stiffness level occurs as a result of the breakage of breakable connection elements in said bearing support under the action of said pre-established minimum unbalance.

4. A method according to claim 1, wherein said step of constructing the bearing support comprises constructing said bearing support so as to have a natural frequency at said lower stiffness level which corresponds to not less than one quarter of the flight idling speed to improve the maneouvrability of the aircraft.

* * * * *